S. COMFORT.
Harvester Cutter.
No. 16,968. Patented April 7, 1857.
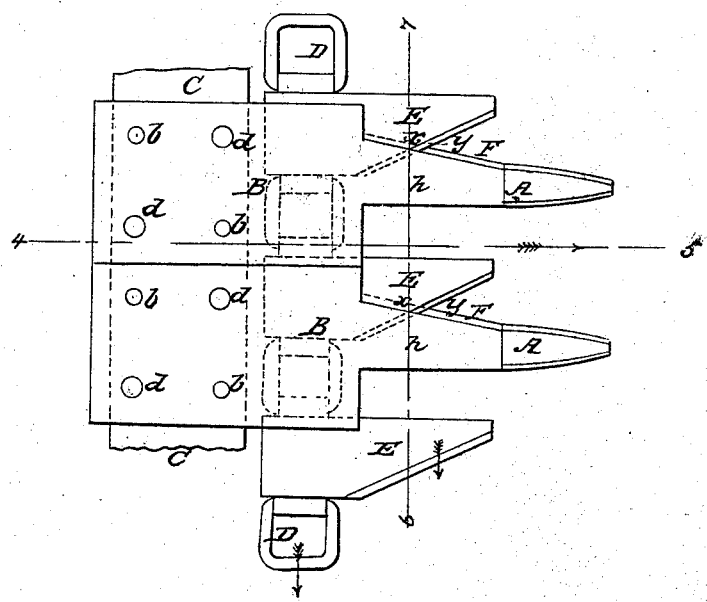
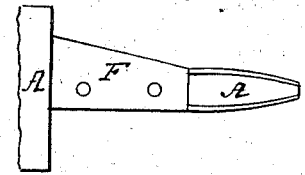
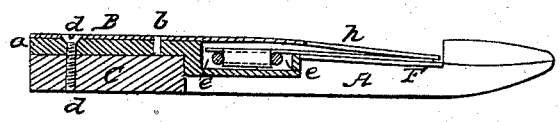
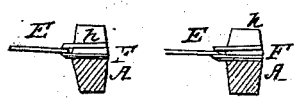

UNITED STATES PATENT OFFICE.

SAMUEL COMFORT, JR., OF MORRISVILLE, PENNSYLVANIA.

IMPROVED CUTTING APPARATUS FOR HARVESTERS.

Specification forming part of Letters Patent No. 16,968, dated April 7, 1857.

*To all whom it may concern:*

Be it known that I, SAMUEL COMFORT, Jr., of Morrisville, Bucks county, in the State of Pennsylvania, have invented a new and useful Improvement in Cutters for Harvesters; and I do hereby declare that the following is a full, clear, and exact description of the same, reference being had to the accompanying drawings, and to the letters of reference marked thereon.

My invention relates to an improvement in the construction of the cutting apparatus of the harvester for which a patent was granted to me on the 18th day of March, 1856; and it consists in securing to the finger-bar a series of springs so bent and twisted as to press the cutting-edges of the traversing against those of the stationary knives at those points only where the close proximity of the knives is necessary for their proper and efficient action on the grain or grass, thereby avoiding the injurious amount of friction produced by the ordinary arrangement of spring-cutters.

In order to enable others skilled in the art to make and use my invention, I will now proceed to describe its construction and operation.

On reference to the drawings which form a part of this specification, Figure 1 is a ground plan of a portion of my improved cutting apparatus for harvesters; Fig. 2, a transverse section of the same on the line 4 5; Fig. 3, a detached view, showing a portion of one of the fingers with its stationary knife; Fig. 4, a transverse section on the line 6 7 and looking in the direction of the arrows.

C is a portion of the finger-bar of the harvester for which a patent was granted to me on the 18th day of March, 1856.

A A are the fingers, to the flanges *a* of which are secured by rivets *b* springs B B, the fingers and springs together being attached by screws *d* to the finger-bar C. The fingers A have in front of the finger-bar recesses *e*, which form a continuous and uninterrupted groove for the passage of the chain D, to which are secured the upper knives, E. These are straight on one side and inclined on the opposite side, the inclined edges being beveled from the under side. The inclined edges of the projections *h*, which form a part of the springs B, are so bent or twisted downward and so arranged as to bear against the top of the beveled edge of the knives E as they pass in the direction of the arrow, between the said projections *h* and stationary knives F, thereby bringing the cutting-edges of the movable and stationary knives in close contact with each other. Thus when the cutters are in the position shown in Fig. 1 the inclined edges of the elastic projections *h* are bearing against the top of the beveled edge of the cutters E at the point *x* only, (the remaining portion of the knives being free from contact with the spring,) and the two edges of the knives are therefore pressed hardest toward each other at the point *y*. As the movable cutters traverse in the direction of the arrow the points of contact of the elastic projections *h h* and the points where the cutters are pressed together become changed. It will be thus seen that the pressure of the springs is exercised throughout the entire cut at the most serviceable points only, causing no more friction than is absolutely necessary to sever the stalks of grain or grass. The increased cutting effect of the above arrangement of cutters is obvious.

On account of the knives E E being confined by the springs, the chain D, to which the said knives are attached, is suspended in a groove formed by the recesses *e* of the fingers, and thus the friction which would otherwise be caused by the rubbing of the chain against the bottom of the groove avoided.

I am aware that springs have been heretofore used for the purpose of pressing the knives of harvesters together, and thereby increasing their cutting effect, so arranged, however, as to have an extensive frictional surface. I therefore do not desire to claim exclusively the employment of such springs; but

What I claim as new, and desire to secure by Letters Patent as an improvement on the cutting apparatus of harvesters for which a patent was granted to me on the 18th day of March, 1856, is—

The springs B, with their twisted or bent projections *h*, in combination with the endless chain of cutters D and E and stationary knives F, when the said parts are constructed and arranged for operation in the manner and for the purpose set forth.

In testimony whereof I have signed my name to this specification before two subscribing witnesses.

SAMUEL COMFORT, JR.

Witnesses:
HENRY HOWSON,
WILLIAM E. WALTON.